United States Patent [19]

Breitschwerdt et al.

[11] 4,111,480
[45] Sep. 5, 1978

[54] HOLLOW BEARER OF A PASSENGER MOTOR VEHICLE

[75] Inventors: Werner Breitschwerdt, Stuttgart; Sigmund Kania, Sindelfingen; Theodor Ukena, Schonaich; Otto Schwämmle, Simmozheim, all of Germany

[73] Assignee: Daimler-Benz Aktiengesellschaft, Germany

[21] Appl. No.: 776,248

[22] Filed: Mar. 10, 1977

[30] Foreign Application Priority Data

Mar. 13, 1976 [DE] Fed. Rep. of Germany ....... 2610732

[51] Int. Cl.² .................... B60R 21/04; B62D 25/00
[52] U.S. Cl. .................................. 296/28 R; 296/84 A
[58] Field of Search ............... 296/28 R, 28 J, 28 K, 296/84 A, 85

[56] References Cited

U.S. PATENT DOCUMENTS

| 2,717,173 | 9/1955 | Rabe | 296/28 R |
|---|---|---|---|
| 2,802,692 | 8/1957 | Stocks | 296/28 R |
| 3,158,395 | 11/1964 | Smith | 296/28 R |
| 3,526,426 | 9/1970 | Wessells | 296/28 R |
| 3,904,223 | 9/1975 | Wilfert et al. | 296/28 R |

Primary Examiner—Richard A. Bertsch
Attorney, Agent, or Firm—Craig & Antonelli

[57] ABSTRACT

A hollow bearer for a passenger motor vehicle which extends in the vehicle transverse direction underneath the rear window, which is constructed as channel for the air exhaust and which, except for the offset connecting areas on the side of the rear columns, consists of three profiled sheet-metal members non-detachably connected with each other; the first, rear upper sheet-metal member is thereby provided with a support flange for the rear window while the second sheet-metal member which is equipped with inlet openings for the exhaust air, adjoins the support flange in the direction of a forward hat storage shelf; the first and second sheet-metal members are then completed into an air guide channel by a closure sheet-metal member disposed therebelow whereby the closure sheet-metal member forms the rear termination of a bearer sheet-metal member for the hat storage shelf.

10 Claims, 5 Drawing Figures

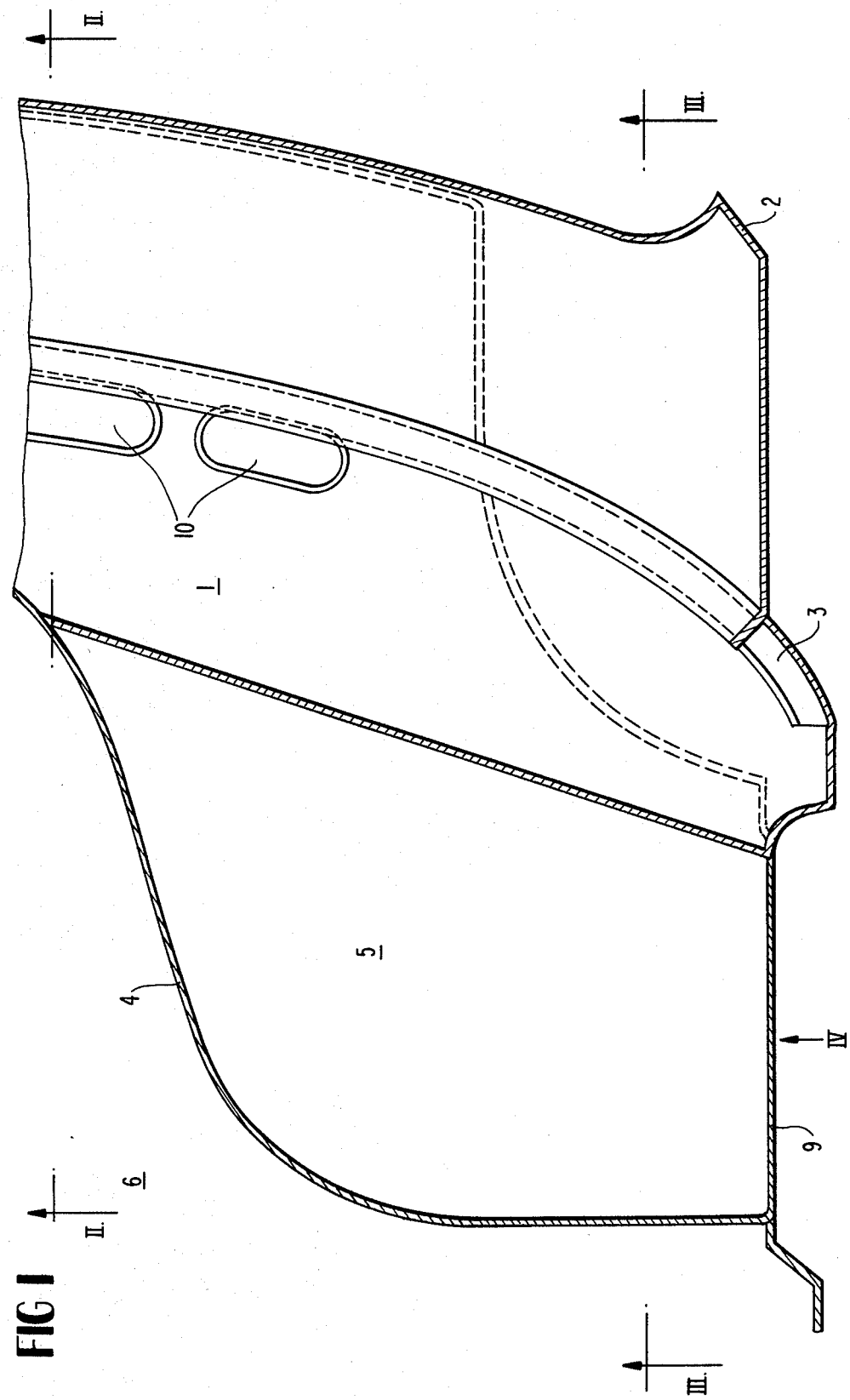

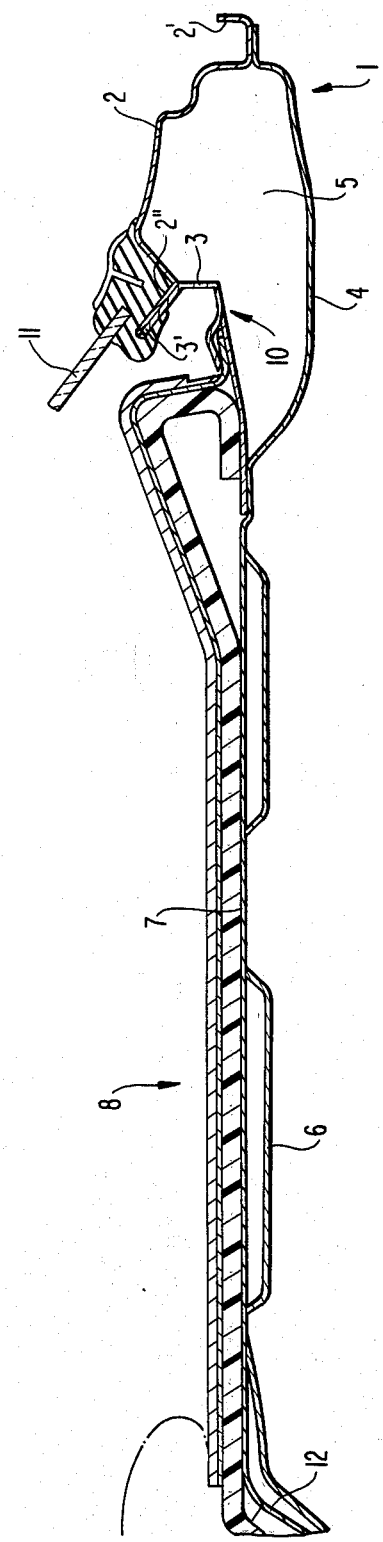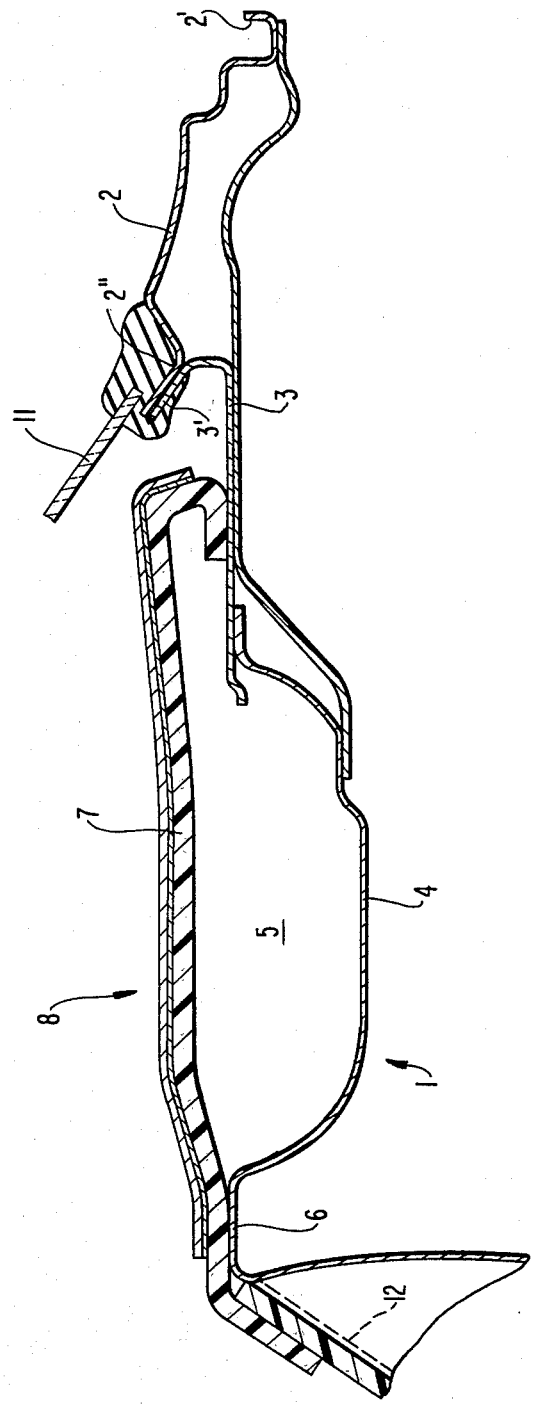

HOLLOW BEARER OF A PASSENGER MOTOR VEHICLE

The present invention relates to a hollow bearer of a passenger motor vehicle, which extends in the vehicle transverse direction underneath the rear windowpane, which in particular is constructed as channel for the exhaust air conduction, and which, except for the offset connecting are on the side of the rear column, consists of three profiled sheet-metal parts non-detachably connected with each other, of which the rear upper sheet-metal part is provided, on the one hand, with a channel-shaped terminal edge and, on the other, with a support flange for the rear windowpane and in which the second sheet-metal part adjoins the support flange in the direction of a hat storage shelf, which is equipped with inlet openings for the exhaust air and in which both the first and second sheet-metal parts are completed into an air guide channel by means of a closure sheet-metal part disposed therebelow.

The present invention is concerned with the task to so further develop this prior art construction of an air guide channel that a construction is attained which is more favorable from a cost point of view. In addition to a more a simple manufacture of the sheet-metal parts, also a better accessibility during the body assembly is to be attained, whereby the rigidity of the vehicle in the rear area is to remain the same.

The underlying problems are solved according to the present invention in that the closure sheet-metal member forms the rear termination of the support of bearer sheet-metal member for the hat storage shelf.

In order to achieve an additional reinforcement, a trough is formed out of this closure sheet-metal member.

According to one embodiment of the present invention, the sheet-metal closure member is completed into an air guide channel within the offset connecting area only by a removable covering of the hat storage shelf.

This entails the advantage that any foreign bodies which might possibly have penetrated into the air guide or air conduction channel can be readily removed after lifting the covering.

According to a further feature of the present invention, the sheet-metal closure member includes one upwardly, angularly bent fastening flange each for the connection to the inner side of the rear column whereby the assembly can be considerably simplified.

Accordingly, it is an object of the present invention to provide a hollow bearer of a passenger motor vehicle which avoids by simple means the aforementioned shortcomings and drawbacks encountered in the prior art.

Another object of the present invention resides in a hollow bearer of a passenger motor vehicle forming an air conduction channel, which is more favorable as regards manufacturing and assembly costs.

A further object of the present invention resides in a hollow bearer of a passenger motor vehicle of the type described above, in which an improved accessibility during the assembly of the body is attained without reduction of the strength and rigidity of the vehicle within the rear area thereof.

Still another object of the present invention resides in a hollow bearer of passenger motor vehicles which not only exhibits a substantial reinforcement but also permits inspection and cleaning of the air conduction channel by extremely simple means.

These and other objects, features and advantages of the present invention will become more apparent from the following description when taken in connection with the accompanying drawing which shows, for purposes of illustration only, one embodiment in accordance with the present invention, and wherein:

FIG. 1 is a plan view on an air guide channel within its offset connecting area, which is constructed as hollow bearer in accordance with the present invention;

FIG. 2 is a cross-sectional view taken along line II—II in FIG. 1;

FIG. 3 is a cross-sectional view taken along line III—III in FIG. 1;

Figure 4:
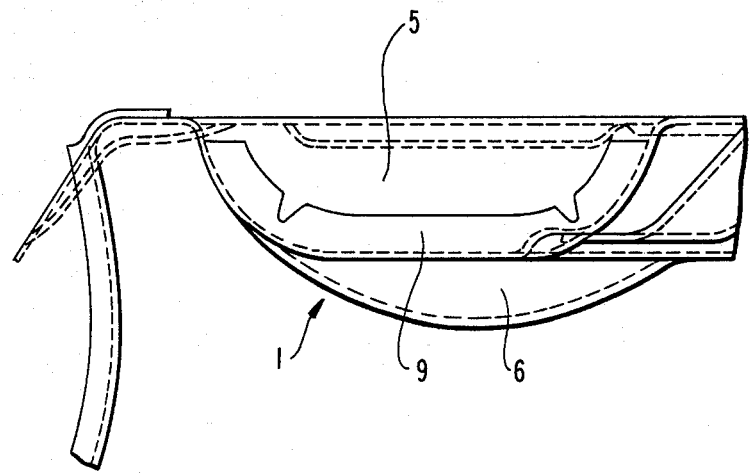
FIG. 4 is an elevational view of the connecting area as viewed in the direction of arrow IV in FIG. 1.

Referring now to the drawing wherein like reference numerals are used throughout the various views to designate like parts, FIGS. 1 to 4 illustrate an air-guide or air-conduction channel generally designated by reference numeral 1 constructed as hollow bearer, which is formed of sheet-metal profile members, and more particularly of a rear, upper sheet-metal member 2 and of an adjoining sheet-metal member 3, as well as of a closure sheet-metal member 4 disposed therebelow. The upper sheet-metal member 2 is provided with a channel-shaped terminal edge 2' as well as with a support flange 2'' for the rear window while the adjoining sheet-metal member 3 is provided with a connecting flange 3' for connection with the support flange 2''.

The sheet-metal closure member 4, out of which a trough 5 may be formed, forms the rear termination of a sheet-metal bearer member 6. The offset connecting area of the sheet-metal closure member 4 on the side of the rear column (FIG. 3) is open in the upward direction and is completed into the air guide channel 1 only by a removable covering 7 of the hat storage shelf generally designated by reference numeral 8. In order to connect the air guide channel 1 with the inner sheet-metal member of the two rear columns (not shown), an angularly bent fastening flange 9 (FIGS. 1 and 4) is provided on both sides at the closure sheet-metal member 4 of the bearer member 6 at the upwardly open trough 5.

In order that exhaust air can be removed out of the passenger space by way of the air guide channel 1, several air inlet openings 10 (FIGS. 1 and 2) which are arranged covered off, are provided in the sheet-metal member 3 within the area underneath the rear window 11.

Figure 5:
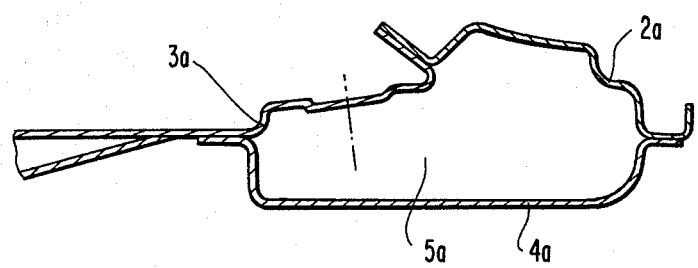
FIG. 5 is a cross-sectional view through the prior art construction of the air guide channel analogous to FIG. 2.

The prior art construction of the air guide channel is illustrated in FIG. 5.. The step-by-step assembly thereby takes place in that at first the structural part 2a is joined to the structural part 3a. The structural part 4a disposed therebelow together with its trough 5a has to be fixed at first by a corresponding device prior to the assembly in order that a positionally correct connection is made possible.

In contradistinction thereto, the closure sheet-metal member 4 and the sheet-metal bearer member 6 are constructed in one piece in the embodiment according to the present invention as shown in FIGS. 1 to 4 and are connected with the rear wall 12 of the rear seat. Consequently, the assembly operations can take place in a working plane that can be viewed and supervised from above. The structural parts 2 and 3 which had been connected with each other already prior thereto, can thereby be readily brought into the assembly position and can be readily joined to the closure sheet-metal member 4. A device for fixing the structural members can be dispensed with. Owing to the open rear area of the air guide channel 1 which is open at the top and is thereby accessible from above, the closure sheet-metal member 4 according to the present invention may be provided on each side with a fastening flange 9 and can therewith be connected fixedly with the rear columns. This was not possible heretofore, for in the prior art construction the connection to the rear column had to take place by interposition of a seal because any other type of sealed connection with respect to the rear column had to be eliminated by reason of the lack of accessibility.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A hollow bearer of a passenger motor vehicle which extends essentially in the vehicle transverse direction below a rear windowpane, said hollow bearer serving as channel means for the exhaust air guidance, said hollow bearer including three profiled sheet-metal members which, except for the offset connecting areas on the side of rear columns, are non-detachably connected with each other, a first, rear upper one of said sheet-metal members being provided with a support flange for the rear window, a second one of said sheet-metal members, which is equipped with inlet openings for the exhaust air, adjoining said first sheet-metal member within the area of the support flange in the direction of a hat storage shelf, and said first and second sheet-metal members being completed into an air guide channel by a third closure sheet-metal member disposed therebelow, characterized in that the closure sheet-metal member forms the rear termination of a sheet-metal bearer member for the hat storage shelf.

2. A hollow bearer according to claim 1, characterized in that the hollow bearer consists of said three profiled sheet-metal members except within the offset connecting areas on the side of the rear columns.

3. A hollow bearer according to claim 2, characterized in that said first sheet-metal member includes a channel-shaped terminal edge.

4. A hollow bearer according to claim 3, characterized in that a trough is formed out of the closure sheet-metal member.

5. A hollow bearer according to claim 4, characterized in that the closure sheet-metal member is completed within the offset connecting area into the air guide channel only by a removable cover means of the hat storage shelf.

6. A hollow bearer according to claim 5, characterized in that the closure sheet-metal member is provided with one upwardly angularly bent fastening flange each for the connection to the inner side of the rear column.

7. A hollow bearer according to claim 1, characterized in that a trough is formed out of the closure sheet-metal member.

8. A hollow bearer according to claim 1, characterized in that the closure sheet-metal member is completed within the offset connecting area into the air guide channel only by a removable cover means of the hat storage shelf.

9. A hollow bearer according to claim 1, characterized in that the closure sheet-metal member is provided with one upwardly angularly bent fastening flange each for the connection to the inner side of the rear column.

10. A hollow bearer according to claim 7, characterized in that the hollow bearer consists of said three profiled sheet-metal members except within the offset connecting areas on the side of the rear columns.

* * * * *